US012600202B2

(12) United States Patent
Kim

(10) Patent No.: US 12,600,202 B2
(45) Date of Patent: Apr. 14, 2026

(54) ADJUSTABLE AIR VENT AND METHOD OF CONTROLLING THE SAME

(71) Applicant: HYUNDAI MOBIS Co., Ltd., Seoul (KR)

(72) Inventor: Won Sik Kim, Hwaseong-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 438 days.

(21) Appl. No.: 17/852,978

(22) Filed: Jun. 29, 2022

(65) Prior Publication Data

US 2023/0067559 A1 Mar. 2, 2023

(30) Foreign Application Priority Data

Aug. 31, 2021 (KR) ........................ 10-2021-0115951

(51) Int. Cl.
B60H 1/34 (2006.01)

(52) U.S. Cl.
CPC ... B60H 1/3421 (2013.01); B60H 2001/3478 (2013.01)

(58) Field of Classification Search
CPC ..................................... B60H 1/34–2001/3492
See application file for complete search history.

(56) References Cited

U.S. PATENT DOCUMENTS

2004/0142653 A1* 7/2004 Gehring ............... B60H 1/3421
454/155
2015/0328958 A1* 11/2015 Winget, Jr. ........ B60H 1/00742
454/155

2017/0106274 A1* 4/2017 Ramcheran ............. A63F 13/24
2017/0246931 A1* 8/2017 Bourqui ............. B60H 1/00871
2019/0126727 A1 5/2019 Stiver
2021/0031594 A1 2/2021 Schaal

FOREIGN PATENT DOCUMENTS

| JP | H0420949 U | * | 2/1992 | |
| JP | 2016-196213 A | | 11/2016 | |
| KR | 10-2017-0053016 A | | 5/2017 | |
| KR | 10-2019-0084342 A | | 7/2019 | |
| WO | WO-2016157790 A1 | * | 10/2016 | ............... B60H 1/00 |

OTHER PUBLICATIONS

Office Action issued in corresponding Korean Patent Application No. 10-2021-0115951 dated Dec. 4, 2025.

* cited by examiner

*Primary Examiner* — Steven B Mcallister
*Assistant Examiner* — Michael James Giordano
(74) *Attorney, Agent, or Firm* — MORGAN, LEWIS & BOCKIUS LLP

(57) ABSTRACT

An air vent that enables both the adjustment by a knob and the adjustment by an external adjuster by applying an independent knob that is not mechanically connected to the air vent, along with a method for controlling the same, is disclosed. The air vent includes: a wind direction adjustment mechanism configured to adjust a wind direction of a wind discharged from the air vent; an actuator configured to drive the wind direction adjustment mechanism; a knob configured to control the actuator to adjust the wind direction adjustment mechanism; and a position sensor configured to detect a position of the wind direction adjustment mechanism. The knob is electrically connected to the actuator and is not mechanically connected to the wind direction adjustment mechanism.

11 Claims, 4 Drawing Sheets

ADJUSTABLE AIR VENT AND METHOD OF CONTROLLING THE SAME

CROSS-REFERENCE TO RELATED APPLICATION

This application claims priority to and the benefit of Korean Patent Application No. 10-2021-0115951, filed on Aug. 31, 2021, the disclosure of which is incorporated herein by reference in its entirety.

TECHNICAL FIELD

The present disclosure relates to an air vent technology for a vehicle capable of adjusting a wind direction or a wind volume.

BACKGROUND

An air vent installed on a cockpit not only performs their original functions related to heating, cooling and air circulation in vehicles but also plays a big role in the design aesthetic sense of the cockpit. In other words, air vent devices adjust the direction and volume of wind coming out through heating, ventilation, & air conditioning (HVAC) systems for heating and cooling adjustment in the vehicles. In general, knobs exposed to dashboards are used to adjust the wind directions and wind volumes of the air vents.

Recently, as the cockpit modules are designed to be slim, the air vents are also designed to be slim. FIG. 1 shows a schematic structure of a slim type air vent. A front wing 20 is installed at a front side (bonnet side of a vehicle body) inside a duct housing 10, and a rear wing 30 is installed at a rear side (driver's seat side) therein. The front wing 20 has a structure in which a plurality of wind direction wings vertically arranged rotate horizontally, and the rear wing 30 has a structure in which a plurality of wind direction wings (one wing is illustrated in the slim type of FIG. 1) positioned horizontally rotates vertically. The front wing 20 and the rear wing 30 are assembled in the duct housing 10 to form an air vent assembly. A horizontal rotation adjustment of the front wing 20 and a vertical rotation adjustment of the rear wing 30 are performed by a wing knob exposed toward the driver's seat. According to an embodiment, the wing knob includes a wing knob rear 50 exposed toward the driver's seat and a wing knob front 60 that is in the duct housing 10. As described above, the wing knob rear 50 is mechanically connected to the front wing and the rear wing within the air vent assembly to move the front wing and the rear wing horizontally and vertically to adjust the wind direction and the wind volume.

SUMMARY

In general, a knob is applied to adjust the wind direction and wind volume of an air vent, and this knob should be mechanically connected to components within the air vent, and thus many design restrictions occur. It is also possible to adjust the wind direction and the wind volume in an electric manner without applying a wing knob, but in this case, the wind direction and the wind volume need to be operated only by a separate operation means (e.g., a button or a touch screen) and thus it is not intuitive to a driver, and an action may not be taken when manual adjustment is needed or unavoidable.

Accordingly, the inventor proposes an air vent to which an independent knob that is not mechanically connected to an air vent is applied to enable both the adjustment by the knob and the adjustment by an external adjuster, and a method of controlling the same.

An aspect of the present disclosure, there is provided an air vent including: a wind direction adjustment mechanism configured to adjust a wind direction of a wind discharged from the air vent; an actuator configured to drive the wind direction adjustment mechanism; a knob configured to control the actuator to adjust the wind direction adjustment mechanism; and a position sensor configured to detect a position of the wind direction adjustment mechanism, in which the knob is electrically connected to the actuator and is not mechanically connected to the wind direction adjustment mechanism.

The air vent may further include: an external adjuster configured to output a wind direction adjustment signal for controlling the actuator to adjust the wind direction adjustment mechanism.

According to another aspect of the present disclosure, in order to control the air vent configured as described above, there is provided a system and method for controlling the air vent, which include receiving a wind direction adjustment signal from the knob and the wind direction adjustment signal output from the external adjuster, and outputting a control signal for controlling the actuator configured to control the wind direction adjustment mechanism of the air vent and driving the actuator.

The present disclosure schematically described above will become clearer through the specific embodiments described with reference to the accompanying drawings below.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
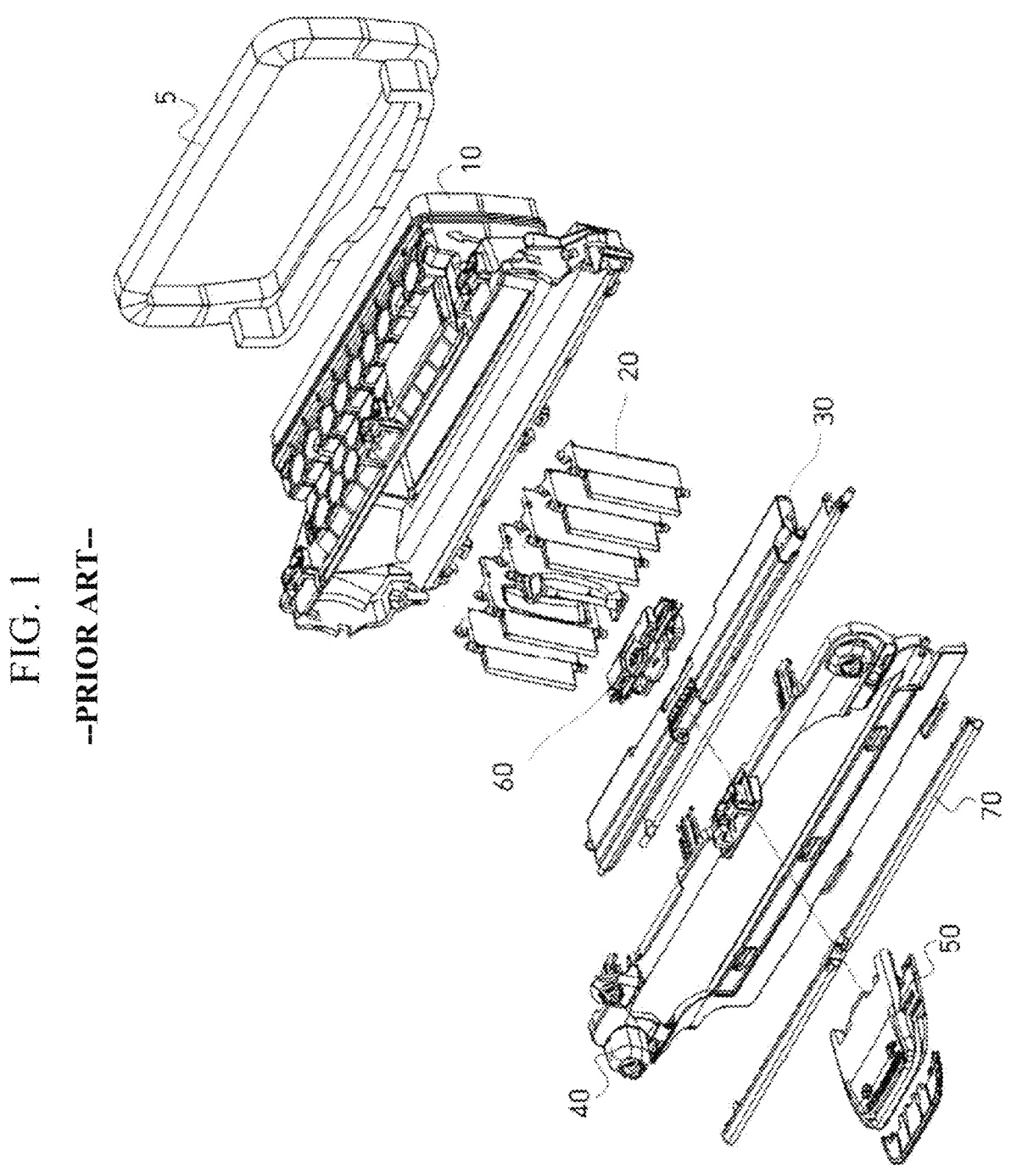
FIG. 1 shows a schematic structure of a slim type air vent.

Advantages and features of the present disclosure and methods of achieving them will be made clear from embodiments described in detail below with reference to the accompanying drawings. However, the present disclosure is not limited to the embodiments disclosed below but will be implemented in various different forms, and only these embodiments are provided so that the disclosure of the present disclosure will be thorough and complete and will fully convey the scope of the present disclosure to those skilled in the art to which the present disclosure pertains, and the present disclosure is defined by the description of the claims. Meanwhile, terms used herein are for the purpose of describing the embodiments and are not intended to limit the present disclosure. In the present specification, the singular forms include the plural forms as well unless the context clearly indicates otherwise. The term "comprise" or "comprising" used herein does not preclude the presence or addition of one or more other elements, steps, operations, and/or devices other than stated elements, steps, operations, and/or devices.

Hereinafter, embodiments of the present disclosure will be described in detail with reference to the accompanying drawings. In adding reference numerals to elements of each drawing, the same elements may have the same reference numeral as possible even when the elements are shown in different drawings, and in addition, in describing the present disclosure, the detailed description of a related known configuration or function will be omitted when it obscures the gist of the present disclosure.

Figure 2:
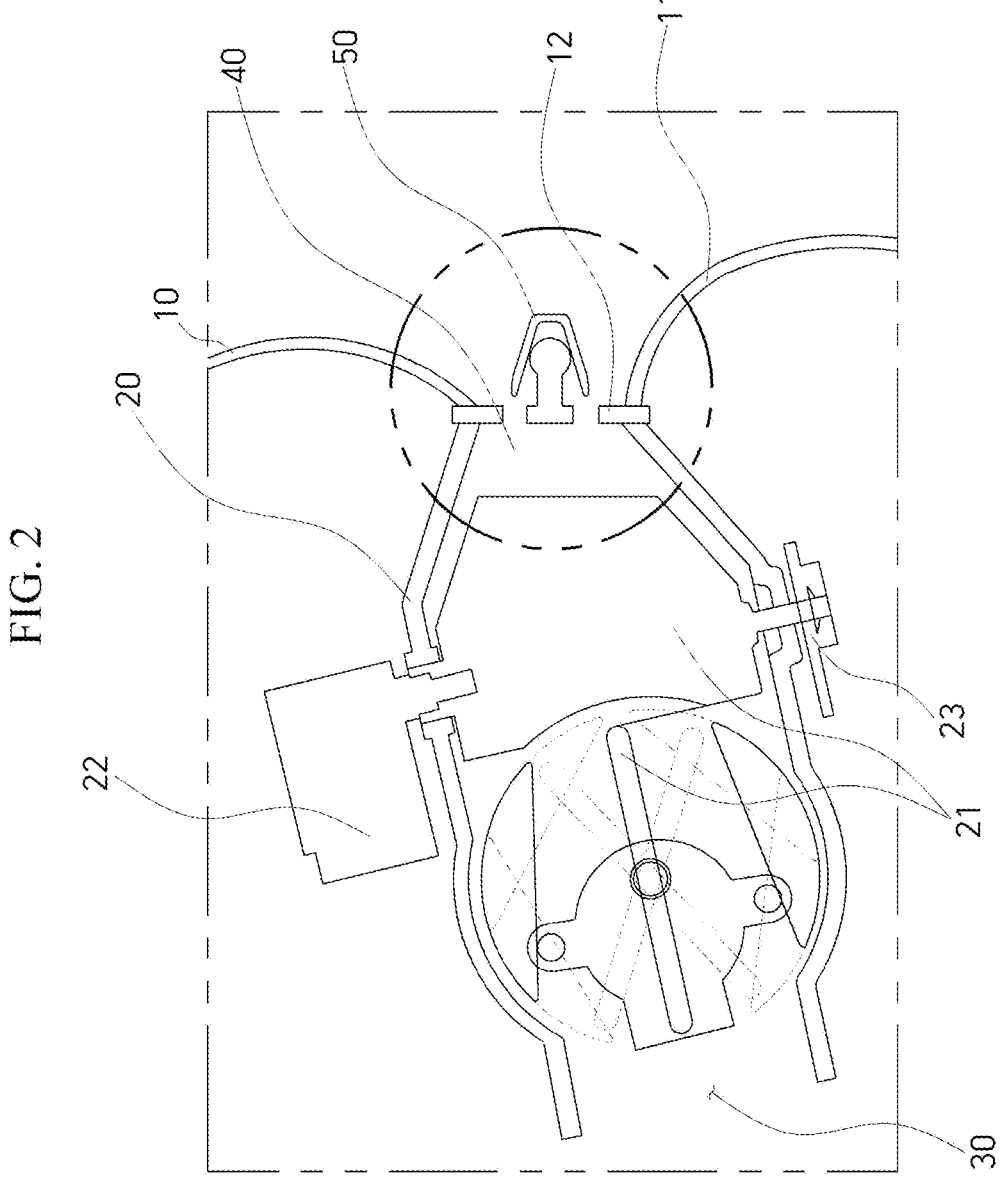
FIG. 2 is a configuration view of an air vent according to an embodiment of the present disclosure.

FIG. 2 is a configuration view of an air vent according to an embodiment of the present disclosure.

An air vent assembly 20 is installed in an inner space formed by an upper garnish 10 and a lower garnish 11 on an instrument panel of a dashboard. The air vent assembly 20 is designed so that air introduced from an air inlet 30 is discharged to an outlet 40. The outlet 40 is open toward the inside of a vehicle. There is a wind direction adjustment mechanism for changing a wind direction, for example, a wing 21, and FIG. 2 conceptually shows a front wind and a rear wing shown in FIG. 1 without distinction in order to describe a conceptual configuration of the present disclosure. Accordingly, a structure of the wing 21 may be differently modified and does not affect the spirit of the present disclosure.

There is an actuator, e.g., a motor 22 in this embodiment, configured to electrically rotate the wind direction adjustment mechanism, that is, the wing 21 to adjust the wind direction/the wind volume. There is an independent knob 50 in the outlet 40. In addition, there is a position sensor 23 configured to detect a current position of the wing 21.

Here, the fact that the knob 50 is independent means that the knob 50 is not mechanically connected to the wing 21 and is independently positioned to control the actuator, that is, the motor 22 to electrically adjust the wing 21. Although described below, a joystick or a return switch is operated by the movement of the knob 50 to enable the adjustment of the wind direction and the wind volume through electrical signals in the conventional mechanical operating force transmission.

Since the knob 50 is independent, a position of the knob 50 is not necessarily positioned in the outlet 40 as shown in FIG. 2. Speaking of extremes, the knob 50 may electrically operate the wing 21 even when the knob 50 is installed at a position (e.g., a steering wheel) far away from the air vent assembly 20. However, it is preferred that the knob 50 be positioned around the outlet like a general air vent for the user's intuitive operation.

In addition, since the knob 50 is not mechanically connected to the wing 21 as in the conventional knob, the degree of freedom of the shape of decoration to be installed around the outlet 40 are increased. The above example is shown in FIG. 2, and the knob 50 does not interfere with a decoration garnish 12 even when the decoration garnish 12 in addition to the upper garnish 10 and the lower garnish 11 is attached. As described above, various design patterns can be applied to the air vent outlet regardless of the knob 50, thereby improving appearance performance.

Figure 3:
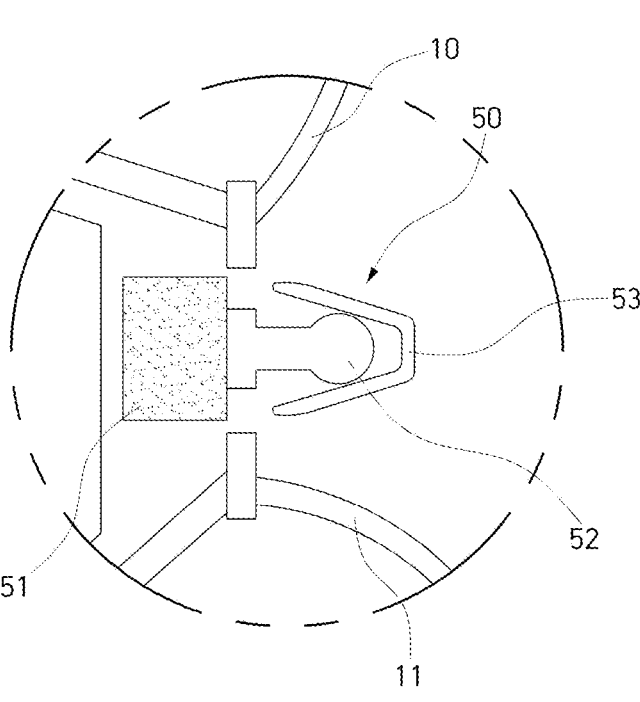
FIG. 3 is a detailed configuration view of a knob 50.

FIG. 3 is a detailed configuration view of the knob 50. Largely, there are a main body 51, an operation unit 52, and an operation unit cover 53.

The main body 51 is a means for outputting a wing adjustment signal, for example, a joystick switch, a return switch, or the like. It will be possible to generate the wing adjustment signal for adjusting the upward, downward, leftward, and rightward directions of the wing 21 using an element such as a variable resistor or a photo-interrupt. The joystick switch is an element used for games or industry and is also widely used in the vehicle. The return switch is a switch having a structure in which an operation knob automatically returns to its original position after the operation of the operation knob, and is also widely used in the vehicle (e.g., a door window switch). The joystick switch may also be referred to as a return switch when an operation lever returns to the original position.

The operation unit 52 is an operating lever protruding from the main body 51 of the switch. The operation unit 52 is configured to return to a neutral position in conjunction with a spring. For example, when the operation unit 52 is pushed to the left, a wing leftward adjustment signal corresponding to a pushed distance is generated in the main body 51, and the operation unit 52 returns to the neutral position. Likewise, when the operation unit 52 is pushed to the right, a wing rightward adjustment signal corresponding to a pushed distance is generated in the main body 51, and the operation unit 52 returns to the neutral position. The upward and downward adjustments are also the same as those described above.

The operation unit cover 53 is a kind of decoration, and is designed according to the design concept of a cockpit module to be covered on the operation unit 52.

Figure 4:
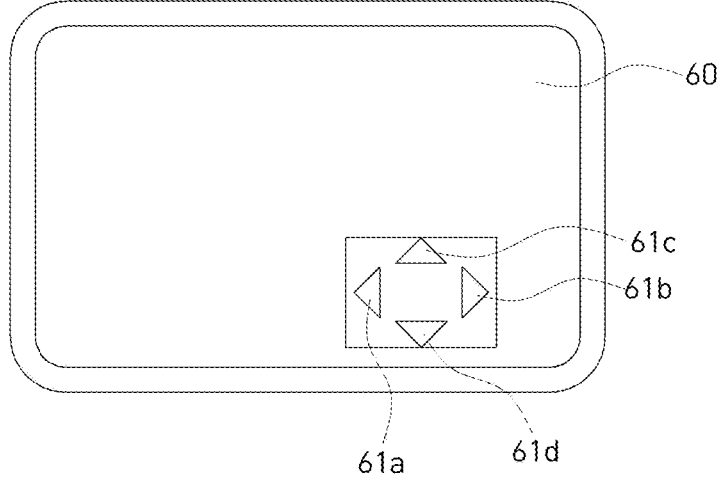
FIG. 4 is an exemplary view of a user interface (UI) 60 of an external adjuster.

FIG. 4 is an exemplary view of the user interface (UI) 60 of the external adjuster. The UI 60 of the external adjuster may be implemented as a display/button or a touch screen of a vehicle audio-video-navigation (AVN). The wing 21 of the air vent may be adjusted by electrical signals generated when direction selectors 61a to 61d provided in the UI 60 of the external adjuster are operated.

In addition, the UI 60 of the external adjuster may also be implemented as the display or the touch screen of the AVN, but may also be implemented as a separate air vent adjustment-dedicated remote controller.

As described above, the air vent according to the present disclosure may be selectively adjusted by a manual operation of the independent knob 50 of FIG. 3 and the operation of the UI 60 of the external adjuster of FIG. 4. The UI 60 of the external adjuster may be operated in various ways different from those shown in FIG. 4, and for example, may be used in various modes that are suitable when the user is not seated on the driver's seat, such as an autonomous vehicle. Meanwhile, the independent knob 50 enables the user's intuitive wind direction adjustment and thus may be actively used in a traveling mode in which the user is seated on the driver's seat.

Figure 5:
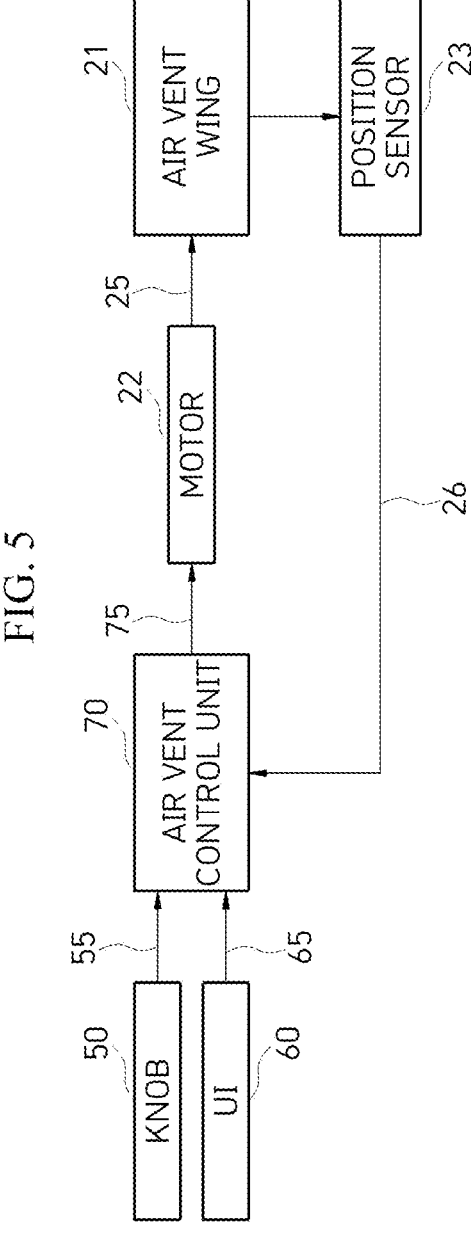
FIG. 5 is a configuration view of a system and method for controlling the air vent according to the embodiment of the present disclosure.

FIG. 5 is a configuration view of a control system of an air vent according to the embodiment of the present disclosure.

An air vent control unit 70 generally manages the adjustment of the air vent. A wing adjustment signal 55 from the independent knob 50 or a wing adjustment signal 65 output from the UI 60 of the external adjuster is input to the air vent control unit 70. Here, the wing adjustment signals 55 and 65 are signals generated according to the operation direction of the knob 50 or the UI 60 of the external adjuster for leftward, rightward, upward, and downward directions of the wing.

The air vent control unit 70 receives the wing adjustment signals 55 and 65 to output a control signal 75 in which at least one controlled variable for adjusting the air vent wing 21 is inherent to drive the motor 22. Accordingly, the air vent wing 21 is adjusted by a drive force 25 output from the motor 22.

Meanwhile, the air vent control unit 70 receives a position signal 26 indicating a current position of the air vent wing 21 from the position sensor 23 in order to generate the at least one controlled variable inherent in the control signal 75. Accordingly, when the air vent control unit 70 receives a wing adjustment command from the knob 50 or the UI 60 of the external adjuster, the air vent control unit 70 controls the wing 21 by calculating the at least one controlled variable of the motor in consideration of the current position of the wing 21 to output the at least one controlled variable corresponding to the command.

According to the present disclosure, it is possible to provide a user with an option of choosing an optimal air vent adjustment means by enabling both the air vent adjustment by a knob and the air vent adjustment by an external adjuster. For example, the knob provides intuitive and quick air vent adjustment function in the traveling case in which the user is seated on the driver's seat, and the external adjuster provides the convenience of the air vent adjustment in the autonomous traveling case in which the user is not in the driver's seat or to the passenger seated on the rear seat.

In addition, since the knob is an independent type and is not mechanically connected to the components within the air vent, the degree of design freedom of the air vent can be improved and the emotional quality can be improved.

Although the configuration of the present disclosure has been described in detail above with reference to the embodiments of the present disclosure, those skilled in the art to which the present disclosure pertains will be able to understand that the present disclosure may be carried out in specific forms different from the contents disclosed herein without changing the technical spirit or essential features of the present disclosure. It should be understood that the above-described embodiments are not limiting but illustrative in all aspects. The scope of the present disclosure is defined not by the detailed description but by the following claims, and all changes or modifications derived from the scope and equivalents of the claims should be interpreted as falling within the technical scope of the present disclosure.

What is claimed is:

1. An air vent comprising:
a wind direction adjustment mechanism configured to adjust a wind direction of wind discharged from the air vent;
an actuator configured to drive the wind direction adjustment mechanism to adjust the wind direction;
a knob configured to control the actuator to adjust the wind direction adjustment mechanism;
an external adjuster configured to output a wind direction adjustment signal for controlling the actuator to adjust the wind direction adjustment mechanism; and
a position sensor configured to detect a position of the wind direction adjustment mechanism, wherein the knob is electrically connected to the actuator and is not mechanically connected to the wind direction adjustment mechanism, and
the knob is attached to a front of the air vent, which has an outlet open toward an inside of a vehicle and from which the wind is discharged, and positioned between an upper garnish and a lower garnish without interfering with the upper garnish and the lower garnish.

2. The air vent of claim 1, wherein the knob is one of a joystick switch or a return switch.

3. The air vent of claim 1, wherein the knob includes:
a main body configured to output a wind direction adjustment signal to the actuator; and
an operation unit included in the main body.

4. The air vent of claim 3, wherein the main body is one of a joystick switch or a return switch.

5. The air vent of claim 3, wherein the operation unit is configured to return to a neutral position after being operated.

6. The air vent of claim 3, wherein the knob further includes a decoration cover installed on the operation unit.

7. The air vent of claim 1, wherein the external adjuster is one of an audio-video-navigation (AVN) or a remote controller.

8. A method of controlling the air vent of claim 1, the method comprising:
receiving a wind direction adjustment signal from the knob; and
outputting an actuator control signal including at least one controlled variable for controlling and driving the actuator configured to control the wind direction adjustment mechanism of the air vent.

9. The method of claim 8, further comprising receiving a position signal indicating a position of the wind direction adjustment mechanism from the position sensor of the air vent in order to calculate the at least one controlled variable included in the actuator control signal.

10. A method of controlling the air vent of claim 1, the method comprising:
receiving at least one of a wind direction adjustment signal from the knob or the wind direction adjustment signal output from the external adjuster; and
driving the actuator by outputting an actuator control signal including at least one controlled variable for controlling the actuator configured to control the wind direction adjustment mechanism of the air vent.

11. The method of claim 10, further comprising receiving a position signal indicating a position of the wind direction adjustment mechanism from the position sensor of the air vent in order to calculate the at least one controlled variable included in the actuator control signal.

* * * * *